(12) United States Patent
Nishiguchi (10) Patent No.: US 7,657,012 B2
(45) Date of Patent: Feb. 2, 2010

(54) TELEPHONE TERMINAL AND METHOD FOR CONTROLLING DISPLAY OF THE TELEPHONE TERMINAL

(75) Inventor: Hitoshi Nishiguchi, Nara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 755 days.

(21) Appl. No.: 11/170,168

(22) Filed: Jun. 30, 2005

(65) Prior Publication Data

US 2006/0002528 A1 Jan. 5, 2006

(30) Foreign Application Priority Data

Jun. 30, 2004 (JP) ............................ P2004-194700

(51) Int. Cl.
*H04M 11/00* (2006.01)
(52) U.S. Cl. .................... 379/93.23; 345/661
(58) Field of Classification Search .............. 379/93.02, 379/52; 345/661
See application file for complete search history.

(56) References Cited

U.S. PATENT DOCUMENTS

| 6,490,343 B2 * | 12/2002 | Smith et al. ................... 379/52 |
| 6,560,320 B1 * | 5/2003 | Paleiov et al. ............ 379/93.23 |
| 2004/0012615 A1 * | 1/2004 | Jang ........................... 345/661 |

FOREIGN PATENT DOCUMENTS

| JP | 6-224825 | 8/1994 |
| JP | 2002-118864 | 4/2002 |
| JP | 2002-125253 | 4/2002 |

OTHER PUBLICATIONS

Notification of Reason for Refusal issued by the Japanese Patent Office on Jul. 8, 2008, for Japanese Patent Application No. 2004-194700, and English-language translation thereof.

* cited by examiner

*Primary Examiner*—Curtis Kuntz
*Assistant Examiner*—Maria El-Zoobi
(74) *Attorney, Agent, or Firm*—Finnegan, Henderson, Farabow, Garrett & Dunner, L.L.P.

(57) ABSTRACT

A telephone terminal is connected to a communication network that transmits voice packets and connected to a terminal control unit. The telephone terminal includes a display, an input buffer, an acquisition unit, and a controller. The input buffer temporarily stores text display information that represents an operational state of the telephone terminal, the text display information being transmitted from the terminal control unit via the communication network. The acquisition unit acquires display control information required for dividing the text display information into a plurality of pieces of component information. The controller reads the text display information stored in the input buffer, divides the text display information into a plurality of pieces of component information based on the display control information, and controls the display to display the component information pieces in different display positions.

8 Claims, 9 Drawing Sheets

DISPLAY CONTROL INFORMATION

FIG. 4

SCREEN TYPE

| CODE | TYPE |
|---|---|
| 0x01 | TERMINAL IDLE SCREEN |
| 0x02 | CALL PROCESSING SCREEN |
| 0x03 | SETTING SCREEN |
| 0x04 | VOICE MAIL SCREEN |
| 0x05 | APPLICATION SCREEN (ACD/MIS) |
| 0x06 | MAINTENANCE SCREEN |

| Fno. | ICON | 1IN_DATA | 2IN_DATA | 1OUT_DATA | 2OUT_DATA |
|---|---|---|---|---|---|
| 1 | 0 | %1 | %2 | | |
| 2 | 0 | DIAL STATION NUMBER | OR ACCESS CODE | Dial | Station Number |
| 3 | 1 | %1 | | | %1 |
| 4 | 1 | CALLING | %1 | Calling | %1 |
| 5 | 1 | RINGING %1 | | Ringing | %1 |
| 5 | 3 | ANNOUNCE TO %1 | %2 | Announce to | %1 |
| 6 | 4 | %1 | | | |
| 7 | 2 | %1 CALLING | | Calling from | %1 |
| 7 | 2 | LINE %1 RINGING | | Ringing | LINE %1 |

Fno. FORMAT NUMBER
ICON IMAGE TYPE NUMBER
1IN_DATA INPUT LCD TEXT DISPLAY DATA (UPPER-STAGE DISPLAY)
2IN_DATA INPUT LCD TEXT DISPLAY DATA (LOWER-STAGE DISPLAY)
1OUT_DATA OUTPUT LCD TEXT DISPLAY DATA (UPPER-STAGE DISPLAY)
2OUT_DATA OUTPUT LCD TEXT DISPLAY DATA (LOWER-STAGE DISPLAY)

FIG. 10

DIAL STATION NUMBER
OR ACCESS CODE

FIG. 11

TELEPHONE TERMINAL AND METHOD FOR CONTROLLING DISPLAY OF THE TELEPHONE TERMINAL

RELATED APPLICATIONS

The present disclosure relates to the subject matter contained in Japanese Patent Application No. 2004-194700 filed on Jun. 30, 2004, which is incorporated herein by reference in its entirety.

BACKGROUND OF THE INVENTION

1. Field of the Invention

The present invention relates to a telephone terminal of a network telephone system and a display control method of the telephone terminal for displaying text display data representing the operational state on an LCD (Liquid Crystal Display) in a network telephone system such as an IP (Internet Protocol) telephone system.

2. Description of the Related Art

In recent years, a network telephone system (IP telephone system) for transmitting and receiving an image and voice as packet data bidirectionally in real time through a packet network has begun to become widespread.

In the IP telephone system, inter-extension and incoming calls can be made for each main apparatus connected to the packet network, of course, and in addition, extension communications can be conducted and outside line outgoing and incoming calls can be made between the main apparatus via the packet network.

By the way, in the IP telephone system, text data representing the operational state can be displayed on an LCD of an IP telephone terminal connected to the packet network to provide an advanced function. (For example, refer to JP-A-2002-125253.) Image data and text data can also be displayed collectively so that the user can understand the operational state of the IP telephone terminal at a glance by seeing the LCD.

SUMMARY OF THE INVENTION

However, in the IP telephone terminal, the size of the LCD is predetermined and if image data and text data (character data) are displayed collectively on the LCD, the text data extends off the LCD screen and thus breaks off before the end of the text data is reached, thus resulting in the display screen hard to view.

The present invention provides a telephone terminal of a network telephone system and a display control method of the telephone terminal for enabling the user to visually check the text data representing the operational state of the telephone terminal on an easy-to-view display screen.

According to a first aspect of the invention, there is provided a telephone terminal connected to a communication network that transmits voice packets and connected to a terminal control unit, the telephone terminal including: a display; an input buffer that temporarily stores text display information that represents an operational state of the telephone terminal, the text display information being transmitted from the terminal control unit via the communication network; an acquisition unit that acquires display control information required for dividing the text display information into a plurality of pieces of component information; and a controller that reads the text display information stored in the input buffer, divides the text display information into a plurality of pieces of component information based on the display control information, and controls the display to display the component information pieces in different display positions.

According to a second aspect of the invention, there is provided a method for controlling a display of a telephone terminal connected to a communication network that transmits voice packets and connected to a terminal control unit, the method including: temporarily storing text display information that represents an operational state of the telephone terminal, the text display information being transmitted from the terminal control unit via the communication network; acquiring display control information required for dividing the text display information into a plurality of pieces of component information; reading the text display information temporary stored; dividing the text display information into a plurality of pieces of component information based on the display control information; and controlling the display to display the component information pieces in different display positions.

According to a third aspect of the invention, there is provided a telephone terminal connected to a communication network that transmits voice packets and connected to a terminal control unit, the telephone terminal including: a display; an input buffer that temporarily stores text display information that represents an operational state of the telephone terminal, the text display information being transmitted from the terminal control unit via the communication network; an acquisition means for acquiring display control information required for dividing the text display information into a plurality of pieces of component information; and a control means for reading the text display information stored in the input buffer, dividing the text display information into a plurality of pieces of component information based on the display control information, and controlling the display to display the component information pieces in different display positions.

DETAILED DESCRIPTION OF THE EMBODIMENT

Hereinafter, embodiments of the invention will be described by reference to the drawings in detail.

First Embodiment

Figure 1:
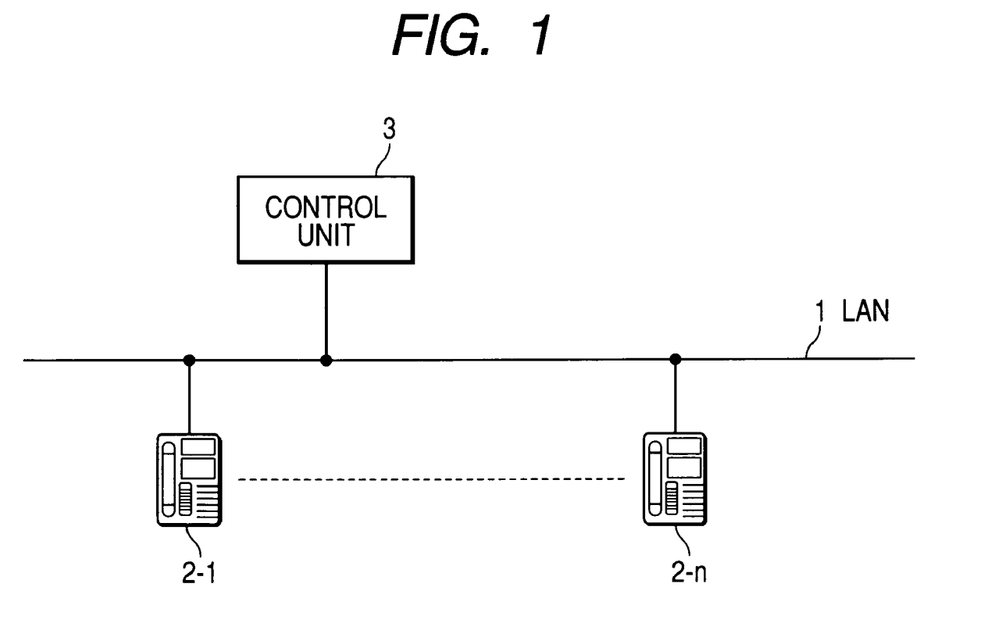
FIG. 1 is a drawing to show a schematic configuration of a network telephone system according to a first embodiment of the invention.

FIG. 1 is a drawing to show a schematic configuration of a network telephone system according to a first embodiment of the invention.

The network telephone system has a LAN 1. A plurality of IP telephone terminals 2-1 to 2-n (where n is a natural number) are connected to the LAN 1. A control unit 3 is also connected to the LAN 1. The control unit 3 monitors the operational state of the IP telephone terminals 2-1 to 2-n connected to the LAN 1 and provides text display data concerning the operational state whenever necessary.

Figure 2:
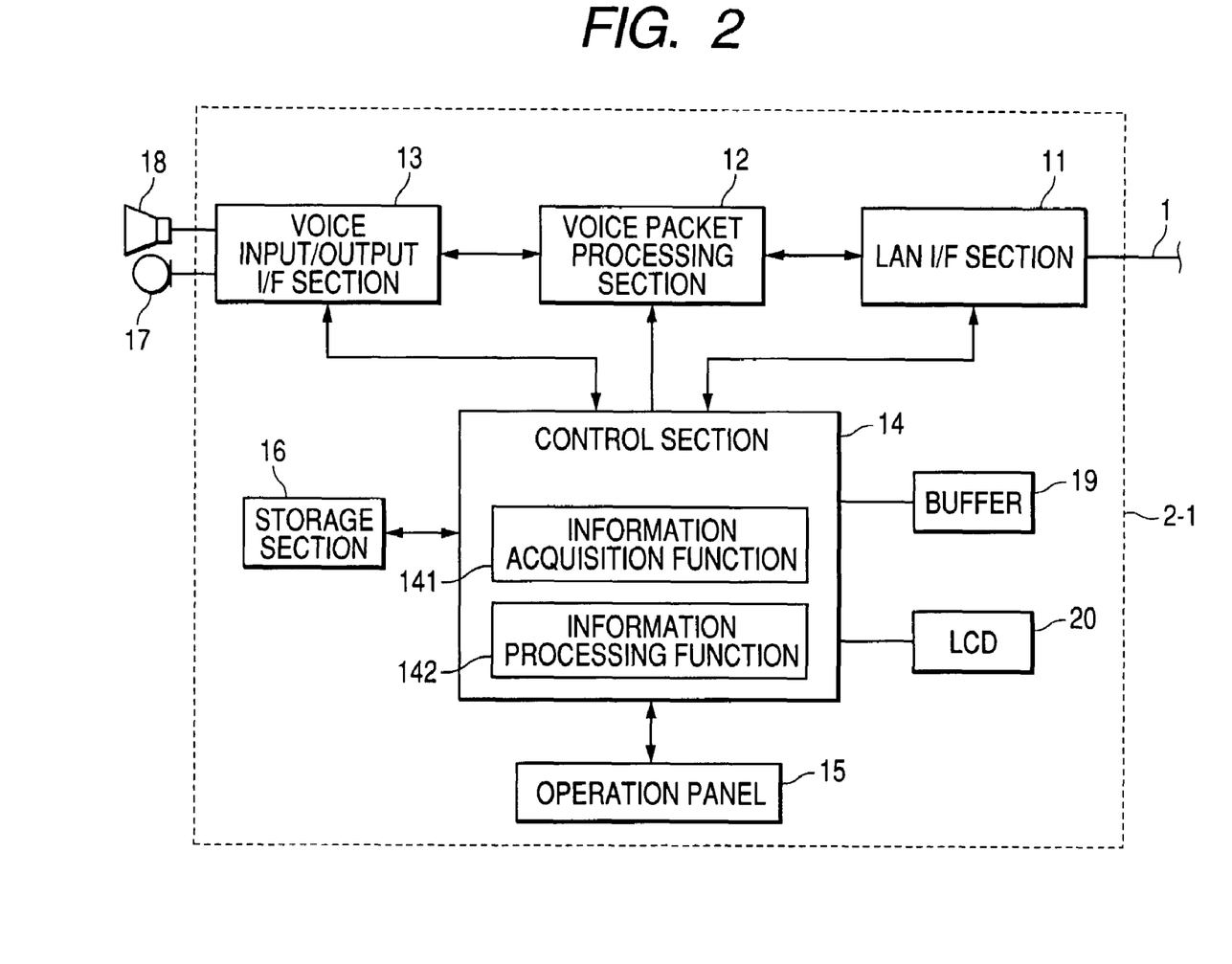
FIG. 2 is a block diagram to show a functional configuration of an IP telephone terminal in the first embodiment.

FIG. 2 is a block diagram to show a functional configuration of the IP telephone terminal 2-1 to 2-n. Here, the IP telephone terminal 2-1 will be discussed as a representative.

The IP telephone terminal 2-1 includes a LAN interface (I/F) section 11, a voice packet processing section 12, a voice input/output interface (I/F) section 13, a control section 14, an operation panel 15, and a storage section 16.

The LAN interface section 11 performs the interface operation involved in the LAN 1. That is, the LAN interface section 11 extracts a voice packet and control data from a transmission packet sent from the LAN 1 and gives the voice packet to the voice packet processing section 12 and the control data to the control section 14. The LAN interface section 11 multiplexes the data given from the control section 14 on the voice packet given from the voice packet processing section 12 into one data and transmits the data to the LAN 1.

The voice packet processing section 12 converts the voice packet given from the LAN interface section 11 into an analog receiving speech voice signal and gives the voice signal to the voice input/output interface section 13. The voice packet processing section 12 converts a sending speech voice signal input from the voice input/output interface section 13 into a voice packet that can be handled in the LAN 1 and gives the voice packet to the LAN interface section 11.

A microphone 17 and a loudspeaker 18 are connected to the voice input/output interface section 13. The voice input/output interface section 13 inputs a sending speech voice signal input through the microphone 17 to the voice packet processing section 12 and outputs the receiving speech voice signal output from the voice packet processing section 12 over the loudspeaker 18.

The control section 14 controls the sections of the telephone terminal 2-1 and performs communication processing with the LAN 1 by performing software processing.

The operation panel 15 has key switches for accepting various commands entered by the user for the control section 14.

The storage section 16 stores display layout data and image data varying from one operational state to another.

The IP telephone terminal 2-1 is also provided with a buffer 19 and an LCD 20. The LCD 20 provides the user with various pieces of information.

The control section 14 includes an information acquisition function 141 and an information processing function 142. When text display data is sent from the control unit 3, the information acquisition function 141 saves the text display data in the buffer 19 and then acquires display control information concerning the text display data.

Figure 3:
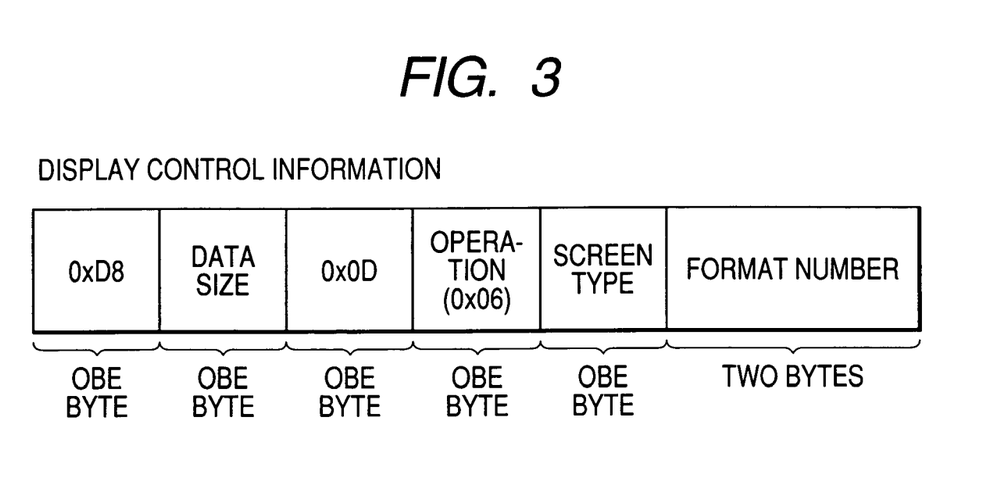
FIG. 3 is a drawing to show a structure of display control information handled in the first embodiment.
Figure 4:
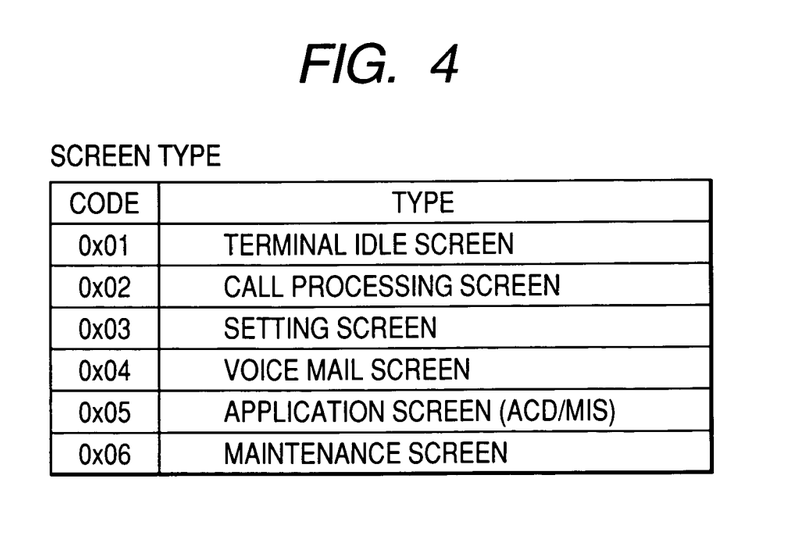
FIG. 4 is a drawing to show details of screen type information in the display control information shown in FIG. 3.

The display control information contains screen type information representing the operational state of the IP telephone terminal 2-1 and format number information representing the display layout of the text display data, as shown in FIG. 3. Code is assigned to entries of the screen type information, as shown in FIG. 4.

The information processing function 142 reads the corresponding display layout from the storage section 16 based on the format number information of the display control information, divides the text display data saved in the buffer 19 into component data pieces different in display position in accordance with the display layout, and displays the component data pieces on the LCD 20. At this time, when the display control information contains identification information of image data, the image data corresponding to the identification information is read from the storage section 16 and is displayed on the LCD 20 together with the component data.

Next, the processing operation in the configuration will be discussed.

Figure 5:
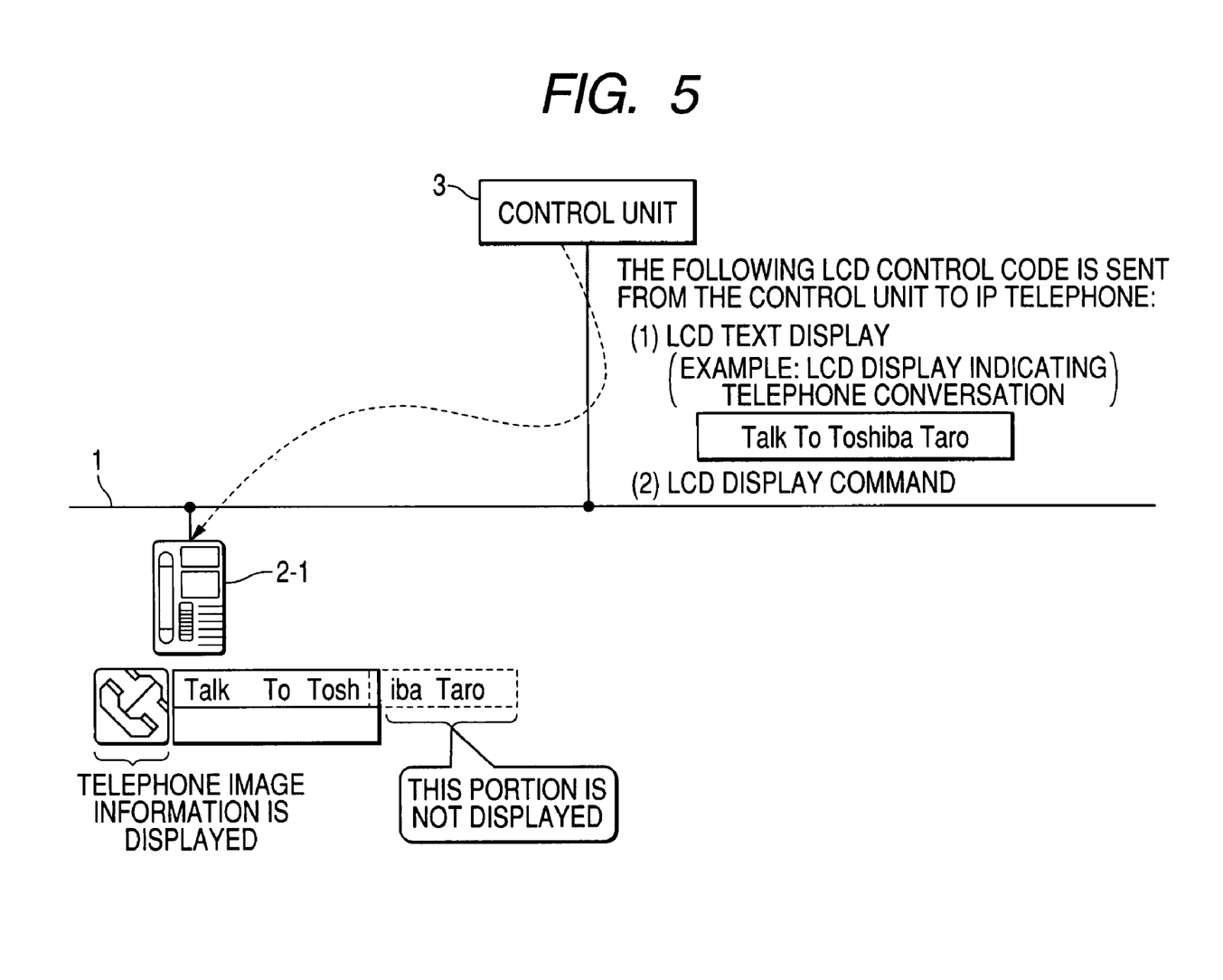
FIG. 5 is a sequence chart to describe a display operation of text display data previously possible.

Now, assume that telephone conversation is made between the IP telephone terminals 2-1 and 2-3, for example, as shown in FIG. 5.

During the telephone conversation, text display data representing the telephone conversation is sent from the control unit 3 to the IP telephone terminal 2-1. At this time, in the IP telephone terminal 2-1, when the image data representing the telephone conversation is displayed on the LCD 20 together with the text display data, the text display data extends off the LCD 20 and it becomes impossible to identify the intended party.

Figure 6:
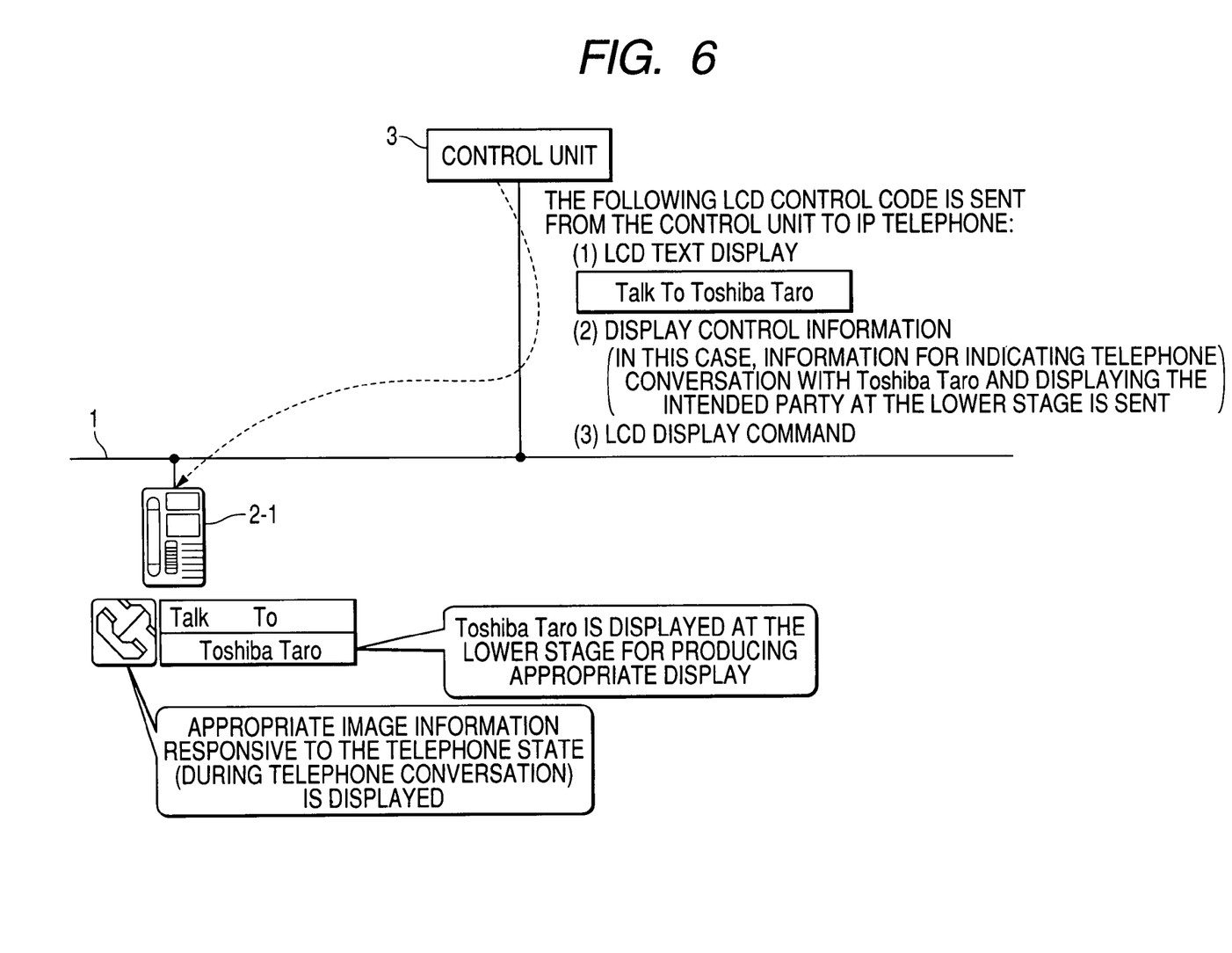
FIG. 6 is a sequence chart to describe a display operation of text display data in the first embodiment.

However, in the embodiment, the text display data is sent from the control unit 3 to the IP telephone terminal 2-1 and display control information for displaying the intended party at the lower stage of the LCD 20 is also sent from the control unit 3 to the IP telephone terminal 2-1.

Figure 7:
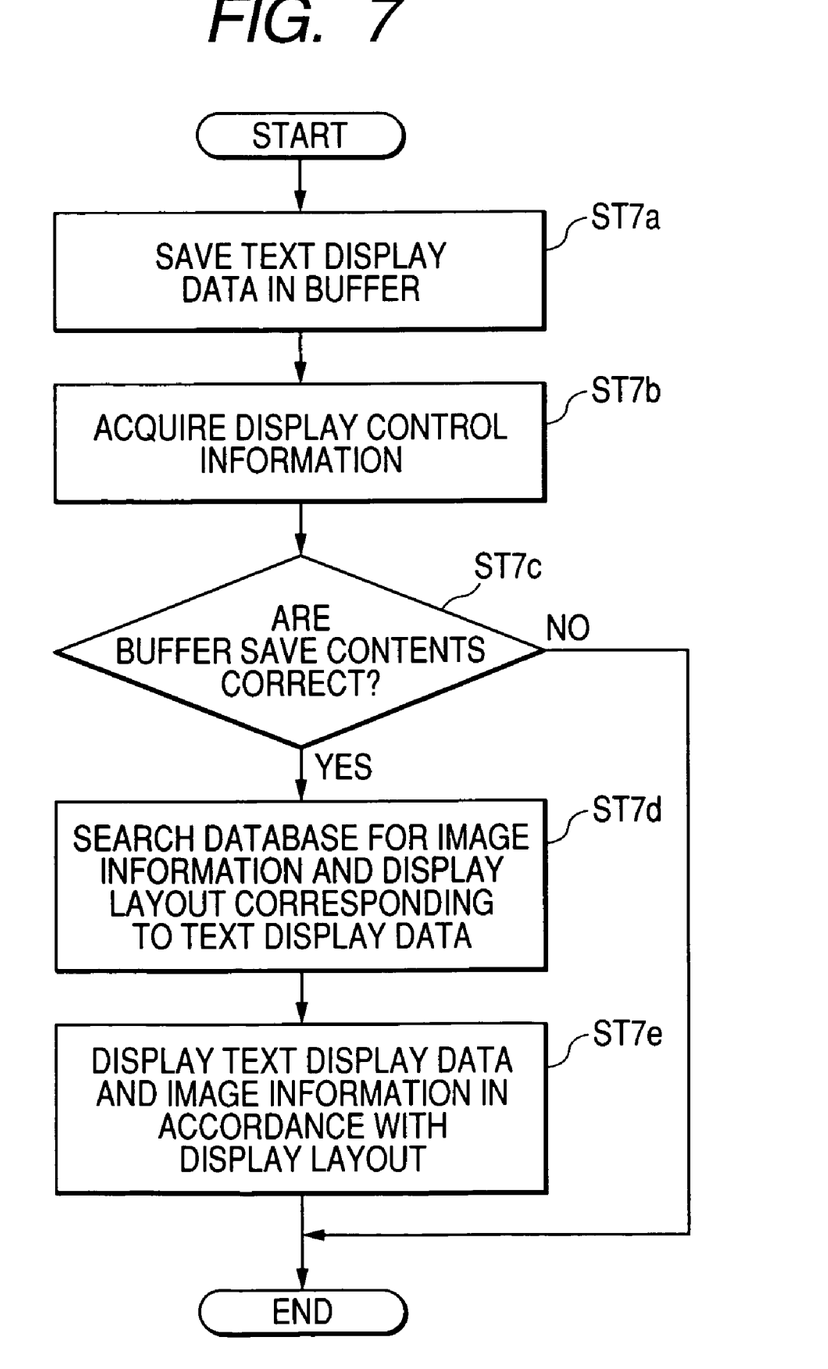
FIG. 7 is a flowchart to show a display procedure of text display data in the first embodiment.

At this time, the IP telephone terminal 2-1 executes control processing shown in FIG. 7.

In the IP telephone terminal 2-1, when the text display data comes from the control unit 3, the control section 14 saves the text display data in the buffer 19 (step ST7a), further acquires display control information concerning the text display data from the control unit 3 (step ST7b), and determines whether or not the description of the text display data saved in the buffer 19 is correct in accordance with the display control information (step ST7c).

When the description of the text display data is correct (YES at step ST7c), the control section 14 searches the storage section 16 for the image data and the display layout corresponding to the text display data based on the display control information (step ST7d) and displays "Talk To" indicating the telephone conversation as the text display data at the upper stage of the LCD 20 and displays the intended party at the lower stage of the LCD 20, for example, in accordance with the found display layout (step ST7e). At the same time, the control section 14 displays the image data on the LCD 20.

When the description of the text display data is not correct (NO at step ST7c), the control section 14 terminates the processing. In this case, the text display data saved in the buffer 19 can also be displayed on the LCD 20 as requested by the user.

As described above, in the first embodiment, in the IP telephone terminal 2-1, when text display data is sent from the control unit 3, prior to display of the text display data, the display control information concerning the text display data is acquired from the control unit 3. When the description of the text display data is correct based on the display control information, for example, the text display data is divided into a component data piece representing the telephone conversation and a component data piece representing the intended party and the component data pieces are displayed at different display positions on the LCD 20.

Therefore, the text display data is displayed at different display positions for each component data piece, so that the need for inputting the text display data to the IP telephone terminal 2-1 in the determined data format is eliminated and the user of the IP telephone terminal 2-1 can check the operational state of the IP telephone terminal 2-1 according to the display screen easy to view.

In the first embodiment described above, not only the text display data, but also the image data relevant to the text display data can be displayed on the same LCD 20 of the IP telephone terminal 2-1, so that the user can rapidly recognize the operational state of the IP telephone terminal 2-1 from the display of the LCD 20. At this time, when identification information of image data is added to the display control information, the image data relevant to the text display data can be automatically displayed on the LCD 20 using the identification information, whereby the processing load on the IP telephone terminal 2-1 when displaying the image data can be decreased.

Second Embodiment

Figure 8:
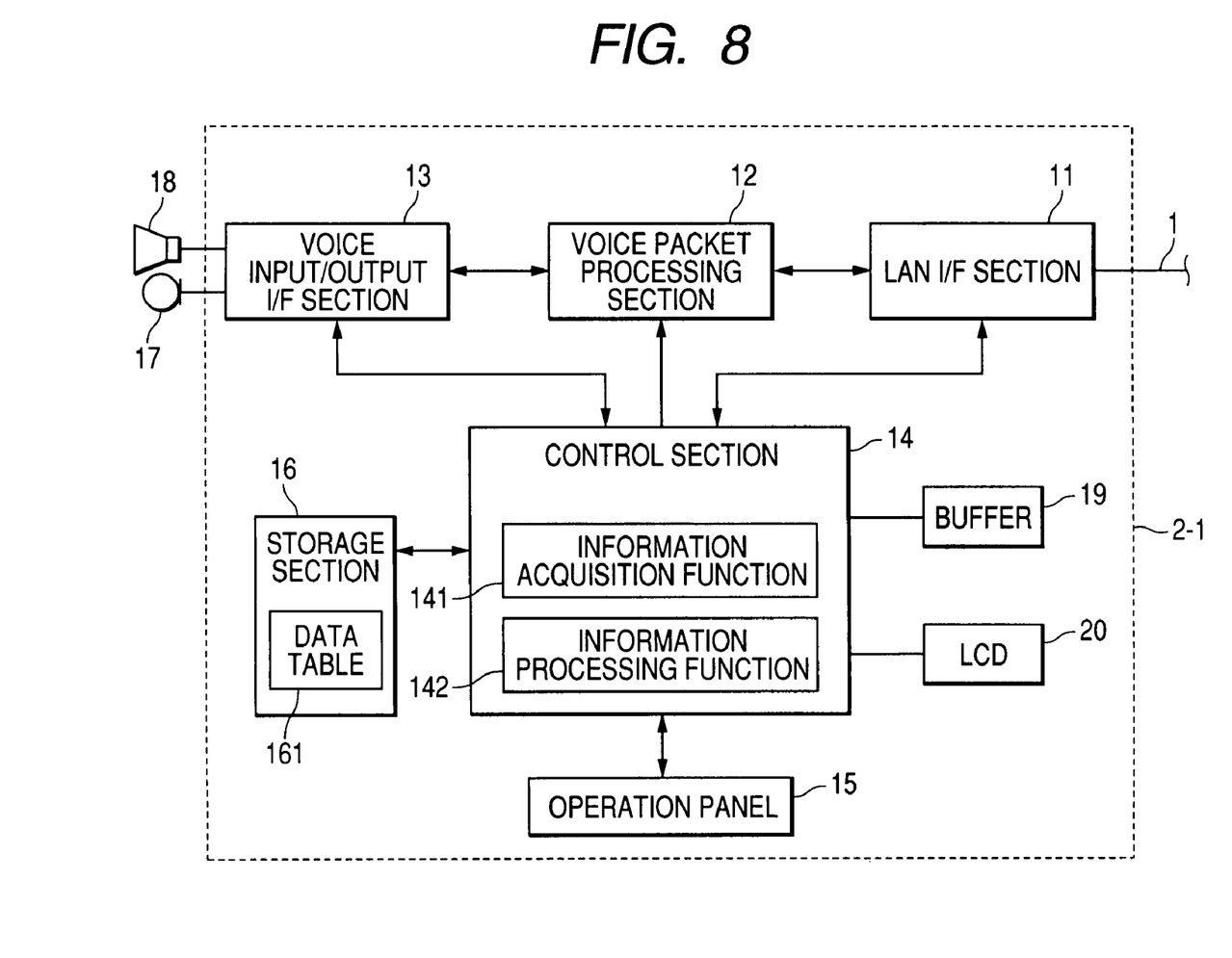
FIG. 8 is a block diagram to show a functional configuration of an IP telephone terminal in a second embodiment.

FIG. 8 is a block diagram to show a functional configuration of an IP telephone terminal 2-1 according to a second embodiment. Parts identical with those previously described with reference to FIG. 2 are denoted by the same reference numerals in FIG. 8 and will not be discussed again in detail.

Figure 9:
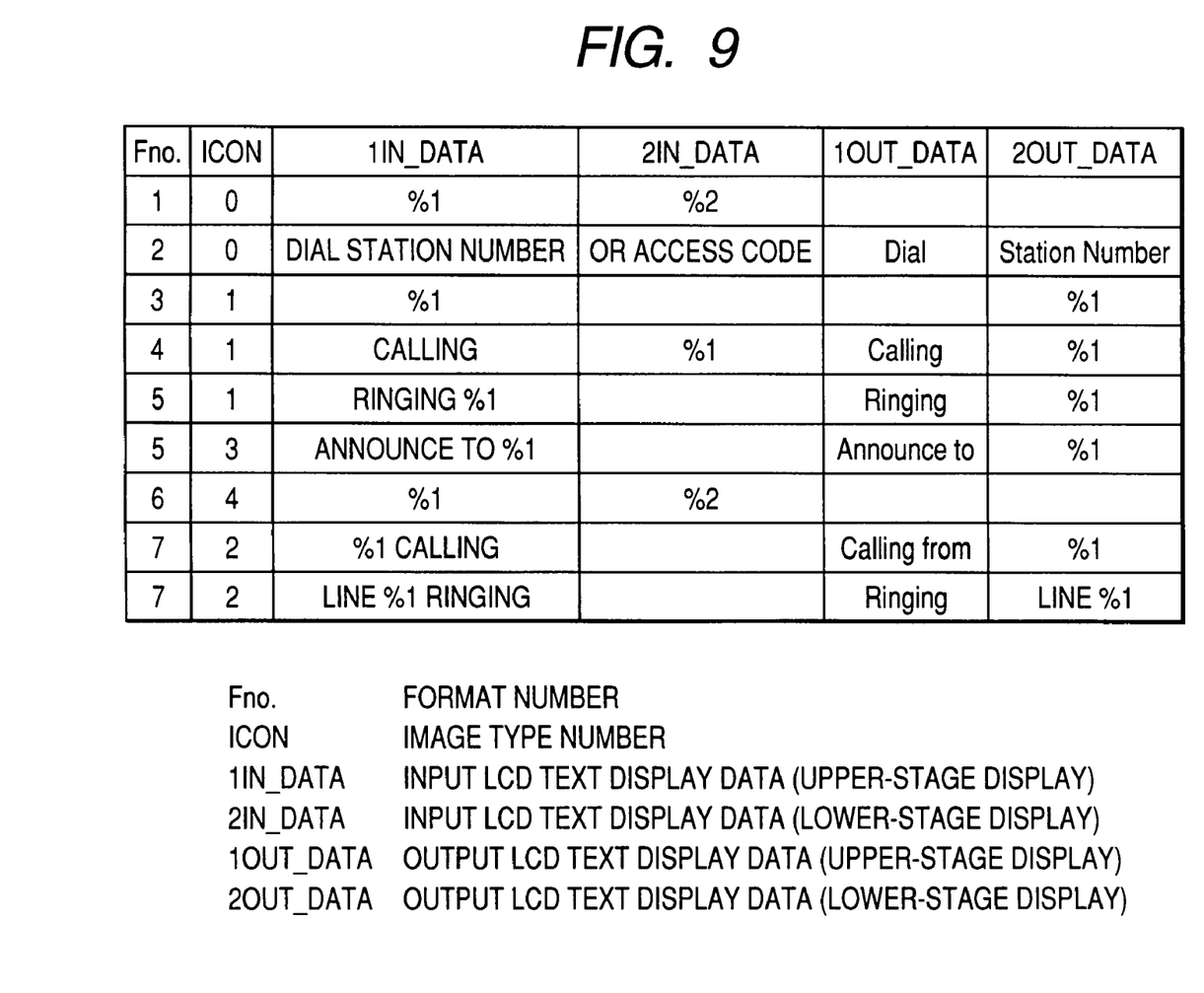
FIG. 9 is a drawing to show an example of storage content of a data table provided in the IP telephone terminal in the second embodiment.

A storage section 16 is provided with a data table 161. The data table 161 stores data representing the correspondence among format number, image data type number, input text display data (upper-stage display), input text display data (lower-stage display), output text display data (upper-stage display), and output text display data (lower-stage display) as shown in FIG. 9.

Next, the processing operation in the configuration will be discussed.

Figure 10:
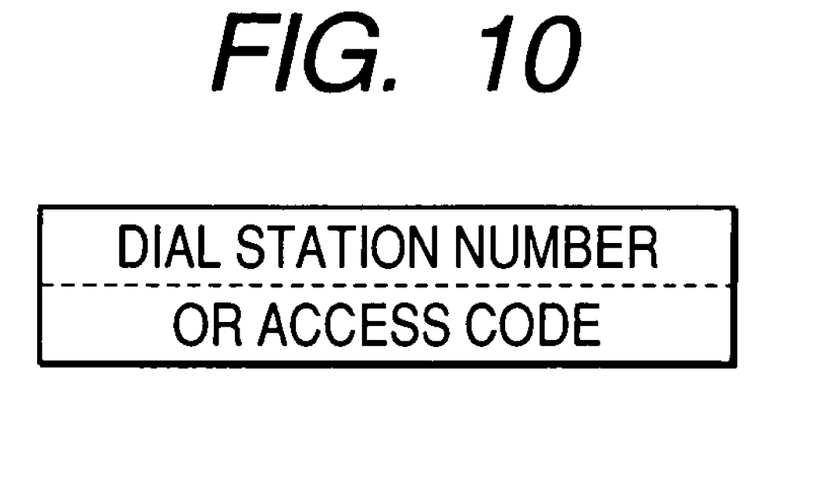
FIG. 10 is a drawing to show a structure of input text display data handled in the second embodiment.

Now, assume that the user of the IP telephone terminal 2-1 lifts the handset off the hook to call an IP telephone terminal 2-4. When the handset is lift, an off-hook signal is transferred to a control unit 3. Upon reception of the off-hook signal from the IP telephone terminal 2-1, the control unit 3 transmits the text display data corresponding to the off-hook signal shown in FIG. 10 to the IP telephone terminal 2-1.

In the IP telephone terminal 2-1, when the text display data comes from the control unit 3, a control section 14 saves the text display data in a buffer 19 and further acquires display control information concerning the text display data from the control unit 3 and determines whether or not the description of the text display data saved in the buffer 19 is correct in accordance with the display control information.

When the description of the text display data is correct, the control section 14 searches the data table 161 in the storage section 16 for output text display data "Dial" "Station Number" corresponding to text display data "DIAL STATION NUMBER" "OR ACCESS CODE" based on the display control information, and displays the found output text display data "Dial" "Station Number" at the upper stage and the lower stage of an LCD 20, and also displays the corresponding image data on the LCD 20.

Figure 11:
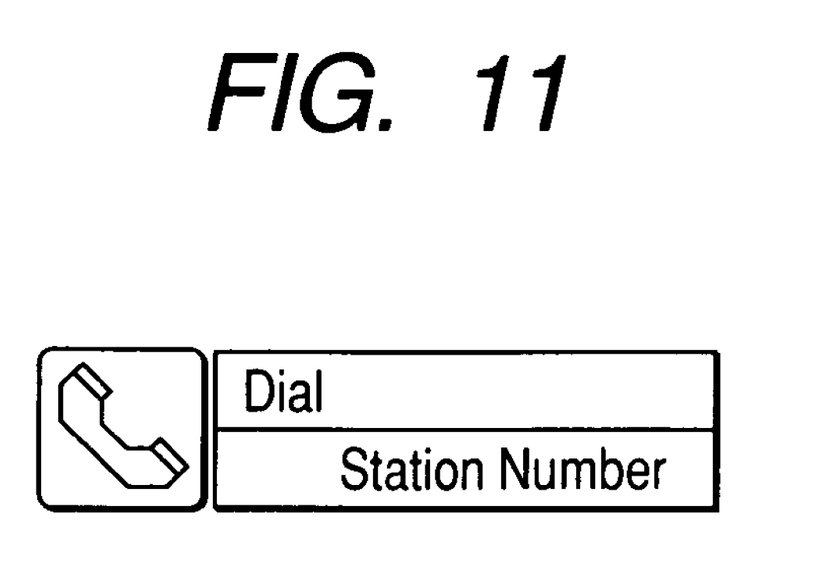
FIG. 11 is a drawing to show a display example of output text display data in the second embodiment.

Thus, the image data and the detail data of the text display data are displayed on the LCD 20 of the IP telephone terminal 2-1, as shown in FIG. 11.

As described above, in the second embodiment, in the IP telephone terminal 2-1, the storage section 16 is provided with the data table 161 representing the correspondence between the input text display data and the output text display data representing the input text display data in an easy-to-see manner, so that the input text display data coming from the control unit 3 is converted into the easy-to-see output text display data and the output text display data is displayed on the LCD 20.

Therefore, when it is dificult to determine the operational state of the IP telephone terminal 2-1 from the input text display data and the image data, the output text display data representing the input text display data in the detailed display format is visually checked on the LCD 20, whereby the user of the IP telephone terminal 2-1 can check the operational state of the IP telephone terminal 2-1 on the easy-to-view display screen.

As described above in detail with reference to the embodiments, when text display information is sent from the terminal control unit, prior to display of the text display information, display control information for dividing the text display information into a plurality of pieces of component information is acquired, the text display information is divided into a plurality of pieces of component information based on the display control information, and the component information pieces are displayed on the display of the telephone terminal at different display positions.

Therefore, the text display information is displayed at different display positions for each component information piece, so that the need for inputting the text display information in the determined data format is eliminated and the user can check the operational state according to the display screen easy to view.

According to the embodiments, not only the text display information, but also the image information relevant to the text display information can be displayed on the same display at the same time, so that the user can rapidly recognize the operational state from the display.

According to the embodiments, the image information relevant to the text display information can be automatically displayed on the display using the identification information added to the display control information, whereby the processing load on the telephone terminal when displaying the image information can be decreased.

According to the embodiments, when the user cannot understand the text display information or the image information, the user can recognize the operational state by seeing the detail information.

As described above in detail, there is provided the telephone terminal of the network telephone system and the display control method of the telephone terminal for enabling the user to visually check the text data representing the operational state of the telephone terminal on an easy-to-view display screen.

Miscellaneous Embodiments

The invention is not limited to the specific embodiments described above. For example, in the description of the first embodiment, the corresponding image data is read from the storage section and is displayed on the LCD based on the identification information of the image data contained in the display control information by way of example, but the invention is not limited to the mode. The description of the text display data may be analyzed and the corresponding image data may be read from the storage section and be displayed on the LCD based on the analysis result.

In the description of the embodiments, the image data is displayed together with the text display data by way of example, but only the text display data may be displayed.

In the description of the embodiments, the display control information is acquired from the control unit by way of example, but may be acquired from any other apparatus or unit than the control unit.

In the description of the embodiments, the IP telephone terminal is taken as an example, but a personal computer or a server having a telephone function, for example, may be adopted.

In the description of the embodiments, the LAN is taken as an example, but the invention can also be applied to any other IP network than the LAN.

It is to be understood that various modifications and changes of the system configuration and type, the configuration of the IP telephone terminal, the types of text display data and image data, the display control procedure of the text display data, etc., may be made without departing from the spirit and the scope of the invention.

The foregoing description of the embodiment of the invention has been presented for purposes of illustration and description. It is not intended to be exhaustive or to limit the invention to the precise form disclosed, and modifications and variations are possible in light of the above teachings or may be acquired from practice of the invention. The embodiment is chosen and described in order to explain the principles of the invention and its practical application program to enable one skilled in the art to utilize the invention in various embodiments and with various modifications as are suited to the particular use contemplated. It is intended that the scope of the invention be defined by the claims appended hereto, and their equivalents.

What is claimed is:

1. A telephone terminal connected to a communication network that transmits voice packets and is connected to a terminal control unit, the telephone terminal comprising:
    a display configured to display a character string representing an operational state of the telephone terminal in a plurality of display lines, the operational state relating to a telephone call placed to or from the telephone terminal;
    an input buffer that temporarily stores text display information including the character string, the text display information being received from the terminal control unit via the communication network;
    an acquisition unit that acquires display control information from the terminal control unit via the communication network, the display control information including a format identifier for identifying a display layout used for dividing the character string into a plurality of character strings for display in the plurality of display lines, the plurality of character strings including a character string identifying a party who is placing or receiving the telephone call;
    a storage unit that stores a plurality of display layouts, including the display layout identified by the format identifier; and
    a controller that reads the text display information stored in the input buffer, divides the character string into the plurality of character strings based on the display layout identified by the format identifier, and controls the display to display the character strings in the plurality of display lines, the plurality of character strings being divided such that the character string identifying the party who is placing or receiving the telephone call is displayed within one of the plurality of display lines.

2. The telephone terminal according to claim 1, wherein the acquisition unit communicates with the terminal control unit to acquire the display control information from the terminal control unit.

3. The telephone terminal according to claim 1, wherein the storage unit stores a plurality of pieces of image information each indicating a different operational state, and
    wherein the controller reads the image information pieces from the storage unit based on a description of the character string and controls the display to display the image information pieces together with the character string.

4. The telephone terminal according to claim 3, wherein identification information specifying one of the image information pieces is added to the display control information, and the controller reads the specified image information piece.

5. The telephone terminal according to claim 3, wherein the storage unit stores detail information that describes the text display information in detail, and
    wherein the controller reads the detail information corresponding to the text display information from the storage unit and controls the display to display the detail information on the display.

6. The telephone terminal according to claim 5, wherein the controller controls the display to display one or more of information provided by combining one of the image information pieces and the detail information or the detailed information.

7. A method for controlling a display of a telephone terminal connected to a communication network that transmits voice packets and is connected to a terminal control unit, the method comprising:
    temporarily storing text display information including a character string representing an operational state of the telephone terminal, the text display information being received from the terminal control unit via the communication network, the operational state relating to a telephone call placed to or from the telephone terminal;
    acquiring display control information from the terminal control unit via the communication network, the display control information including a format identifier for identifying a display layout used for dividing the character string into a plurality of character strings for display in a plurality of display lines on the display, the plurality of character strings including a character string identifying a party who is placing or receiving the telephone call;
    storing a plurality of display layouts, including the display layout identified by the format identifier;
    reading the temporarily stored text display information;
    dividing the character string into the plurality of character strings based on the display layout identified by the format identifier; and
    controlling the display to display the character strings in the plurality of display lines, the plurality of character strings being divided such that the character string identifying the party who is placing or receiving the telephone call is displayed within one of a plurality of display lines on the display.

8. A telephone terminal connected to a communication network that transmits voice packets and is connected to a terminal control unit, the telephone terminal comprising:
    a display configured to display a character string representing an operational state of the telephone terminal in a plurality of display lines, the operational state relating to a telephone call placed to or from the telephone terminal;

an input buffer that temporarily stores text display information including the character string, the text display information being received from the terminal control unit via the communication network;

an acquisition means for acquiring display control information from the terminal control unit via the communication network, the display control information including a format identifier for identifying a display layout used for dividing the character string into a plurality of character strings for display in the plurality of display lines, the plurality of character strings including a character string identifying a party who is placing or receiving the telephone call;

a storage means for storing a plurality of display layouts, including the display layout identified by the format identifier; and a control means for reading the text display information stored in the input buffer, dividing the character string into the plurality of character strings based on the display layout identified by the format identifier and controlling the display to display the character strings in the plurality of display lines, the plurality of character strings being divided such that the character string identifying the party who is placing or receiving the telephone call is displayed within one of the plurality of display lines.

* * * * *